United States Patent
Nelogal et al.

(10) Patent No.: US 10,853,211 B2
(45) Date of Patent: Dec. 1, 2020

(54) SYSTEM AND METHOD FOR CHASSIS-BASED VIRTUAL STORAGE DRIVE CONFIGURATION

(71) Applicant: Dell Products, L.P., Round Rock, TX (US)

(72) Inventors: Chandrashekar Nelogal, Round Rock, TX (US); Rama Rao Bisa, Bangalore (IN); Manjunath Vishwanath, Bangalore (IN); Pavan Kumar Gavvala, Bangalore (IN); Prakash Balasaheb Pawar, Ahmednagar (IN)

(73) Assignee: Dell Products, L.P., Round Rock, TX (US)

(*) Notice: Subject to any disclaimer, the term of this patent is extended or adjusted under 35 U.S.C. 154(b) by 139 days.

(21) Appl. No.: 16/170,290

(22) Filed: Oct. 25, 2018

(65) Prior Publication Data

US 2020/0133538 A1    Apr. 30, 2020

(51) Int. Cl.
*G06F 11/00* (2006.01)
*G06F 11/20* (2006.01)
*G06F 11/10* (2006.01)

(52) U.S. Cl.
CPC ...... *G06F 11/2094* (2013.01); *G06F 11/1092* (2013.01); *G06F 11/2041* (2013.01); *G06F 11/2089* (2013.01)

(58) Field of Classification Search
CPC ............ G06F 11/1092; G06F 11/2041; G06F 11/2089; G06F 11/2094
See application file for complete search history.

(56) References Cited

U.S. PATENT DOCUMENTS

2009/0265510 A1* 10/2009 Walther ............... G06F 11/2094
                                                          711/114
2017/0270001 A1*  9/2017 Suryanarayana ... G06F 11/2089

* cited by examiner

*Primary Examiner* — Charles Ehne
(74) *Attorney, Agent, or Firm* — Fogarty LLP (57) ABSTRACT

Multiple IHSs (Information Handling Systems) may be installed as components of a chassis that has access to a plurality of storage devices via a chassis management controller. An IHS requests configuration of a virtual storage profile, such as a RAID configuration. A remote access controller of the IHS determines physical storage requirements for implementing the requested virtual storage profile. Based on the physical storage requirements, the chassis management controller selects storage devices from idle storage devices mapped to one of the storage controllers installed in one of the IHSs supported by a chassis management controller. The selected storage devices are mapped to the storage controller and used to implement the virtual storage profile. The chassis management controller manages a global pool of spares from the idle storage device for virtual storage profiles supported by the supported storage controllers.

20 Claims, 4 Drawing Sheets

SYSTEM AND METHOD FOR CHASSIS-BASED VIRTUAL STORAGE DRIVE CONFIGURATION

FIELD

The present disclosure generally relates to Information Handling Systems (IHSs), and, more particularly, to the configuration of data storage resources utilized by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to implement data storage system that may include various combinations of storage devices. In such systems, storage devices may be installed, removed and replaced as needed, in many cases without affecting the operation of the IHS. Administrators of such systems may be unable to track the storage devices that are available to an IHS, especially within storage systems that may include multiple different arrays of storage devices. In such data storage systems, storage device failures require replacing failed drives with a spare drive maintained by the system.

SUMMARY

In various embodiments, a method is provided for managing and configuring storage devices available to a plurality of IHSs (Information Handling Systems) installed as components of a chassis. The method includes: identifying, by a chassis management controller, a plurality of idle storage devices mapped to any of a plurality of storage controllers installed in the plurality of IHSs; receiving a request, from a first IHS of the plurality of IHSs, for configuration of a first virtual storage profile; determining, by a remote access controller of the first IHS, physical storage requirements for implementing the requested first virtual storage profile; selecting, by the chassis management controller, a first set of storage devices from the plurality of idle storage devices based on the physical storage requirements provided by the remote access controller; mapping the first set of storage devices to a first storage controller of the first IHS; and configuring, by the first storage controller of the first IHS, the requested first virtual storage profile using the mapped first set of storage devices.

In certain additional embodiments, the method further includes setting each of the storage devices identified as idle by the chassis management controller in a low-power state. In certain additional embodiments, the method further includes determining, by the chassis management controller, spare capacity requirements for the first virtual storage profile. In various additional method embodiments, the chassis management controller determines the spare capacity requirements based on the physical storage requirements for implementing the requested first virtual storage profile. In certain additional embodiments, the method further includes designating, by the chassis management controller, a first storage device from the plurality of idle storage devices as a global spare, wherein the first storage device provides the spare capacity requirements. In certain additional embodiments, the method further includes receiving, by the chassis management controller, a notification of a failed storage device in a virtual storage profile supported by a first storage controller of the plurality of storage controllers. In certain additional embodiments, the method further includes selecting, by the chassis management controller, a storage device from the storage devices designated as global spares as a replacement for the failed storage device. In certain additional embodiments, the method further includes mapping the storage device selected from the global spares to the first storage controller as a replacement for the failed storage device.

In various additional embodiments, a system includes: a plurality of storage devices; a plurality of IHSs (Information Handling Systems) installed as components of a chassis, wherein each IHS comprises a plurality of storage controllers and a remote access controller configured to: receive a request for configuration of a first virtual storage profile by a first storage controller of the plurality of storage controllers; determine physical storage requirements for implementing the requested first virtual storage profile; and a chassis management controller configured to: identify idle storage devices within the plurality of storage devices, wherein the plurality of storage devices are mapped to one of the storage controllers; select a first set of storage devices from the idle storage devices based on the determined physical storage requirements; and map the first set of storage devices to the first storage controller for configuring the requested first virtual storage profile.

In various additional system embodiments, the chassis management controller is further configured to direct each of the identified idle storage devices to be set in a low-power state. In various additional system embodiments, the chassis management controller is further configured to determine spare capacity requirements for the first virtual storage profile. In various additional system embodiments, the chassis management controller determines the spare capacity requirements based on the physical storage requirements for implementing the requested first virtual storage profile. In various additional system embodiments, the chassis management controller is further configured to designate a first storage device from the plurality of idle storage devices as a global spare, wherein the first storage device provides the spare capacity requirements. In various additional system embodiments, the chassis management controller is further configured to receive a notification of a failed storage device in a virtual storage profile supported by a first storage controller of the plurality of storage controllers.

In various additional system embodiments, wherein the chassis management controller is further configured to select a storage device from the storage devices designated as global spares as a replacement for the failed storage device.

In various additional system embodiments, the chassis management controller is further configured to map the storage device selected from the global spares to the first storage controller as a replacement for the failed storage device.

In various additional embodiments, a chassis management controller is configured as a component of a chassis comprising a plurality of storage devices and a plurality of IHSs (Information Handling Systems). The chassis management controller includes one or more processors; and a memory device coupled to the one or more processors, the memory device storing computer-readable instructions that, upon execution by the one or more processors, cause the chassis management controller to: identify idles storage devices within the plurality of storage devices mapped to any of a plurality of storage controllers installed in the plurality of IHSs; receive a request for configuration of storage devices required for implementing a first virtual storage profile by a first storage controller of a first IHS of the plurality of IHSs; select a first set of storage devices from the idle storage devices based on storage device requirements provided in the request; and map the first set of storage devices to the first storage controller for configuring the requested first virtual storage profile.

In various additional chassis management controller embodiments, spare capacity requirements are determined for the first virtual storage profile based on the physical storage requirements for implementing the requested first virtual storage profile. In various additional chassis management controller embodiments, a first storage device is designated from the plurality of idle storage devices as a global spare, wherein the first storage device provides the spare capacity requirements. In various additional chassis management controller embodiments, the chassis management controller is further configured to: receive a notification of a failed storage device in a virtual storage profile supported by a second storage controller of the plurality of storage controllers; select a storage device from the storage devices designated as global spares as a replacement for the failed storage device; and map the storage device selected from the global spares to the second storage controller as a replacement for the failed storage device.

BRIEF SUMMARY

In various embodiments, a method is provided for managing and configuring storage devices available to a plurality of IHSs (Information Handling Systems) installed as components of a chassis. The method includes: identifying, by a chassis management controller, a plurality of idle storage devices mapped to any of a plurality of storage controllers installed in the plurality of IHSs; receiving a request, from a first IHS of the plurality of IHSs, for configuration of a first virtual storage profile; determining, by a remote access controller of the first IHS, physical storage requirements for implementing the requested first virtual storage profile; selecting, by the chassis management controller, a first set of storage devices from the plurality of idle storage devices based on the physical storage requirements provided by the remote access controller; mapping the first set of storage devices to a first storage controller of the first IHS; and configuring, by the first storage controller of the first IHS, the requested first virtual storage profile using the mapped first set of storage devices.

In various additional embodiments, the method further includes setting each of the storage devices identified as idle by the chassis management controller in a low-power state. In various additional embodiments, the method further includes determining, by the chassis management controller, spare capacity requirements for the first virtual storage profile. In various additional method embodiments, the chassis management controller determines the spare capacity requirements based on the physical storage requirements for implementing the requested first virtual storage profile. In various additional embodiments, the method further includes designating, by the chassis management controller, a first storage device from the plurality of idle storage devices as a global spare, wherein the first storage device provides the spare capacity requirements. In various additional embodiments, the method further includes receiving, by the chassis management controller, a notification of a failed storage device in a virtual storage profile supported by a first storage controller of the plurality of storage controllers. In various additional embodiments, the method further includes selecting, by the chassis management controller, a storage device from the storage devices designated as global spares as a replacement for the failed storage device. In various additional embodiments, the method further includes mapping the storage device selected from the global spares to the first storage controller as a replacement for the failed storage device.

In various additional embodiments, a system includes: a plurality of storage devices; a plurality of IHSs (Information Handling Systems) installed as components of a chassis, wherein each IHS comprises a plurality of storage controllers and a remote access controller configured to: receive a request for configuration of a first virtual storage profile by a first storage controller of the plurality of storage controllers; determine physical storage requirements for implementing the requested first virtual storage profile; and a chassis management controller configured to: identify idle storage devices within the plurality of storage devices, wherein the plurality of storage devices are mapped to one of the storage controllers; select a first set of storage devices from the idle storage devices based on the determined physical storage requirements; and map the first set of storage devices to the first storage controller for configuring the requested first virtual storage profile.

In various additional system embodiments, the chassis management controller is further configured to direct each of the identified idle storage devices to be set in a low-power state. In various additional system embodiments, the chassis management controller is further configured to determine spare capacity requirements for the first virtual storage profile. In various additional system embodiments, the chassis management controller determines the spare capacity requirements based on the physical storage requirements for implementing the requested first virtual storage profile. In various additional system embodiments, the chassis management controller is further configured to designate a first storage device from the plurality of idle storage devices as a global spare, wherein the first storage device provides the spare capacity requirements. In various additional system embodiments, the chassis management controller is further configured to receive a notification of a failed storage device in a virtual storage profile supported by a first storage controller of the plurality of storage controllers. In various additional system embodiments, the chassis management controller is further configured to select a storage device from the storage devices designated as global spares as a replacement for the failed storage device. In various additional system embodiments, the chassis management controller is further configured to map the storage device selected from the global spares to the first storage controller as a replacement for the failed storage device.

In various additional embodiments, a chassis management controller configured as a component of a chassis comprising a plurality of storage devices and a plurality of IHSs (Information Handling Systems). The chassis management controller includes: one or more processors; and a memory device coupled to the one or more processors, the memory device storing computer-readable instructions that, upon execution by the one or more processors, cause the chassis management controller to: identify idles storage devices within the plurality of storage devices mapped to any of a plurality of storage controllers installed in the plurality of IHSs; receive a request for configuration of storage devices required for implementing a first virtual storage profile by a first storage controller of a first IHS of the plurality of IHSs; select a first set of storage devices from the idle storage devices based on storage device requirements provided in the request; and map the first set of storage devices to the first storage controller for configuring the requested first virtual storage profile.

In various additional chassis management controller embodiments, the computer-readable instructions further cause the chassis management controller to determine spare capacity requirements for the first virtual storage profile based on the physical storage requirements for implementing the requested first virtual storage profile. In various additional chassis management controller embodiments, execution of the computer-readable instructions further causes the chassis management controller to designate a first storage device from the plurality of idle storage devices as a global spare, wherein the first storage device provides the spare capacity requirements. In various additional chassis management controller embodiments, execution of the computer-readable instructions further causes the chassis management controller to: receive a notification of a failed storage device in a virtual storage profile supported by a second storage controller of the plurality of storage controllers; select a storage device from the storage devices designated as global spares as a replacement for the failed storage device; and map the storage device selected from the global spares to the second storage controller as a replacement for the failed storage device.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
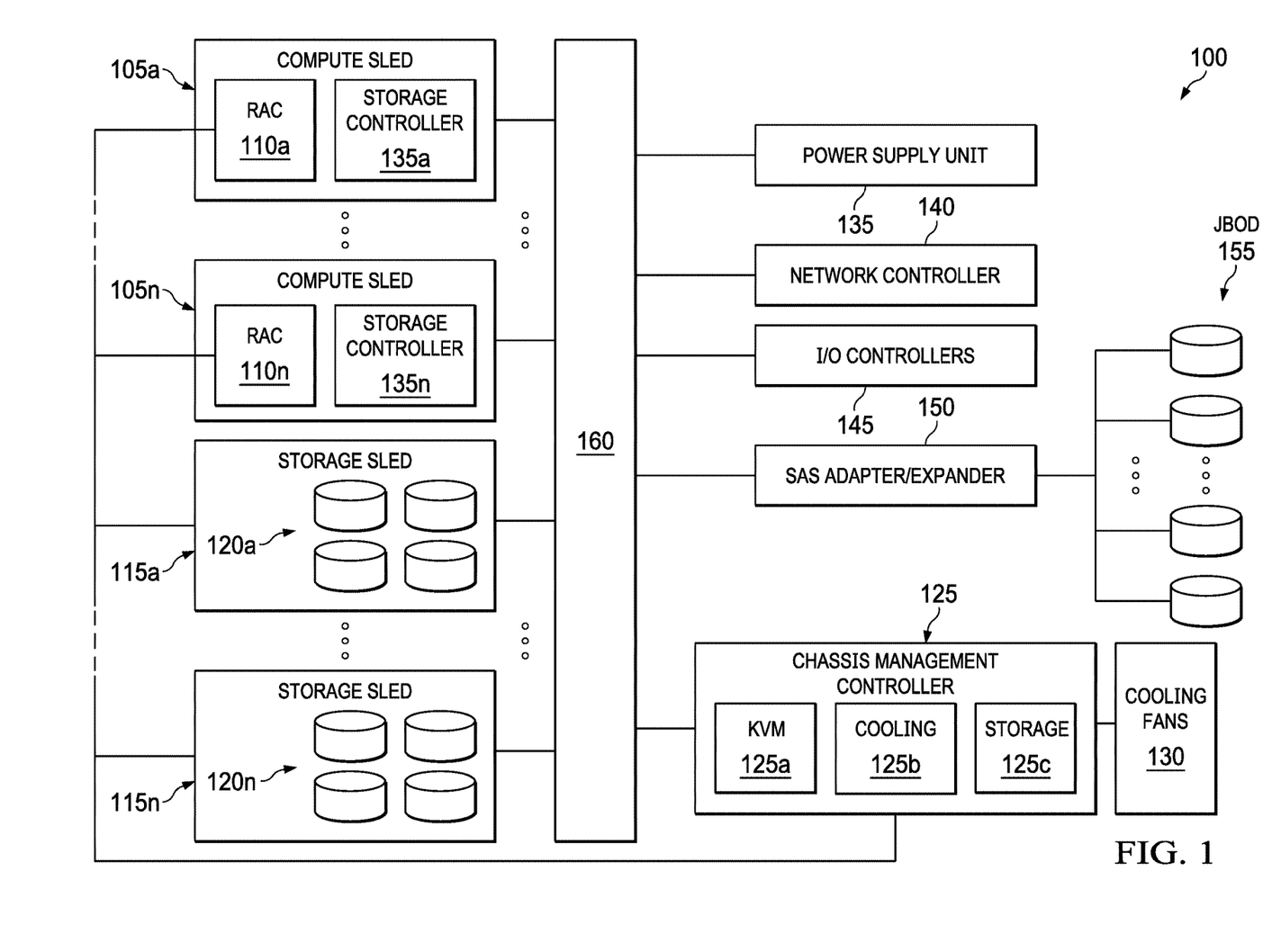
FIG. 1 is a diagram illustrating certain components of a chassis, according to some embodiments, for the selection and configuration of storage drives available to IHSs components of the chassis.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and the storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
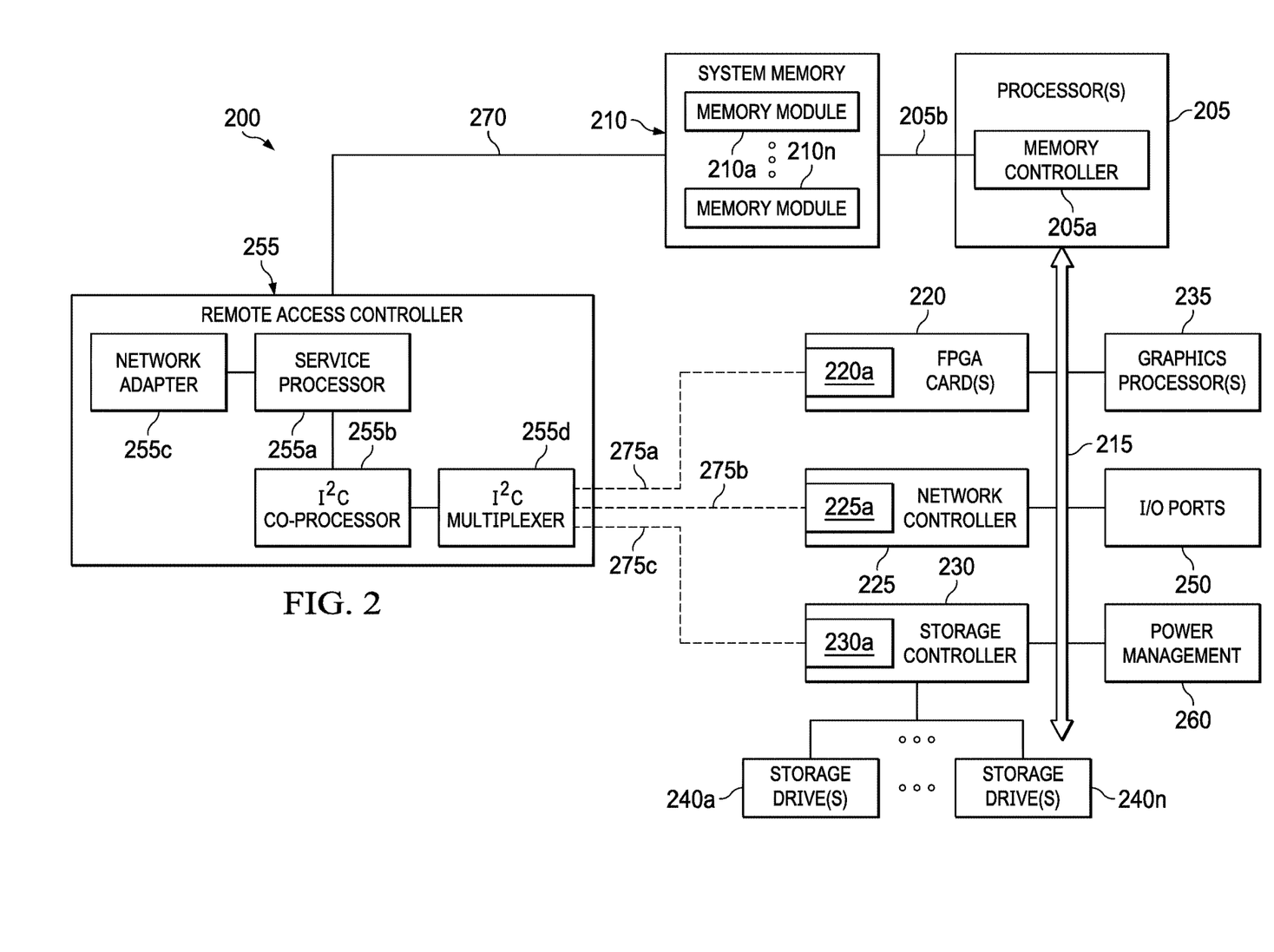
FIG. 2 is a diagram illustrating certain components of an IHS configured as a component of chassis, according to some embodiments, for the selection and configuration of storage drives available via the chassis.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime.

As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controller 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also may be remotely located.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

In the illustrated embodiment, the chassis management controller 125 includes a storage module 125c that provides capabilities for managing and configuring certain aspects of the storage devices of chassis 100, such as the storage devices provided within storage sleds 115a-n and within the JBOD 155. Each of the storage controllers 135a-n may be used to implement various types of virtual storage configurations, such as RAID configurations, using the storage devices provided by the chassis 100. Accordingly, chassis 100 may support large numbers of combinations of different storage devices that may be configured in various types virtual storage profiles, thus resulting in significant difficulty for administrators to track the storage devices that are currently available for setting up a new storage configuration, or for replacing a failed storage device within an existing storage configuration.

Figure 3:
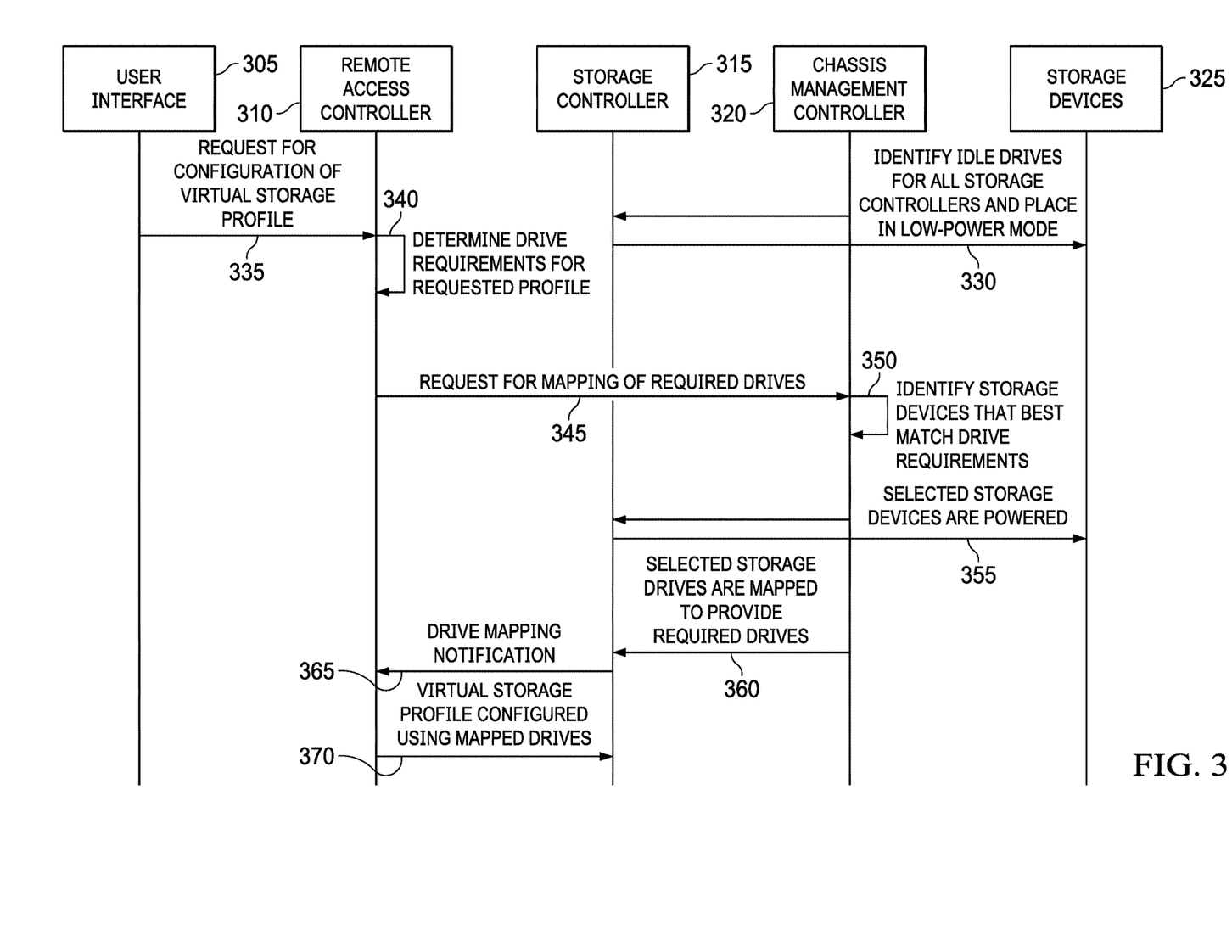
FIG. 3 is a swim-lane diagram describing certain functional responsibilities of components implementing a method, according to some embodiments, for the selection and configuration of storage drives available via a chassis.

As described in additional detail with regard to FIG. 3, the storage module 125c of the chassis management controller 125 may support requests for storage configurations by each of the storage controllers 135a-n by selecting and mapping storage devices from those available within the chassis 100, and in certain embodiments, from those available in any other similarly configured chassis that can be accessed by the chassis management controller 125. As described in additional detail with regard to FIG. 4, the storage module 125c may be further configured to manage all of the unmapped storage devices of chassis 100 as a global pool of spare storage devices that may be used to support the storage configurations operated by each of the storage controllers 135a-n. In this manner, the capabilities of the chassis management controller 125 may provide administrators with the ability to set up virtual storage configurations using all shared storage resources that are available within a chassis 100, or within other accessible chassis.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105a-n, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

IHS 200 may also support one or more storage controllers 230 that may be utilized to provide access to virtual storage configurations. For instance, storage controller 230 may provide support for RAID (Redundant Array of Independent Disks) configurations of storage devices 240a-n, such as storage drives provided by storage sleds 115a-n and JBOD 155 of FIG. 1. In some embodiments, storage controller 230 may be a HBA (Host Bus Adapter). As described in additional detail below, certain virtual storage configurations, such as certain RAID configurations, require access to spare storage devices in order to provide fail-safe operations in response to a storage device failure. In conventional implementations, each storage controller is configured with its own spare storage devices as required to support the virtual storage configurations supported by the storage controller. As described in additional detail with regard to FIG. 4, embodiments provide a capability for managing a pool of spare storage devices for all IHSs, and all storage controllers, installed within the same chassis, thus reducing the overhead required to support multiple sets of spares for each storage controller.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

As described, IHS 200 may be a storage sled 115a-n, such as described with regard to FIG. 1. Accordingly, IHS 200 may be comprised within a large system of similarly configured IHSs that may be housed within the same chassis, rack and/or datacenter. In such scenarios, the remote access controller 255 may be configured to support automated deployment of the operating system of IHS 200 according to configuration settings specified by an administrator. In such scenarios, the automated operating system deployment by remote access controller 255 may include requesting the configuration of spare storage devices from a global pool of spares maintained by a chassis management controller, such as described in additional detail with regard to FIGS. 3 and 4.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various devices 220, 225, 230 of an IHS via a sideband interface. In such embodiments, the messages in support of the monitoring and management function may be implemented using MCTP (Management Component Transport Protocol) that may be transmitted using I2C sideband bus connection 275a-c established with each of the respective managed devices 220, 225, 230. As illustrated, the managed hardware components of the IHS 200, such as FPGA cards 220, network controller 225 and storage controller 230, are coupled to the IHS processor(s) 205 via an in-line bus 215, such as a PCIe root complex, that is separate from the I2C sideband bus connection 275a-c.

In certain embodiments, the service processor 255a of remote access controller 255 may rely on an I2C co-processor 255b to implement sideband I2C communications between the remote access controller 255 and managed components 220, 225, 230 of the IHS. The I2C co-processor 255b may be a specialized co-processor or micro-controller that is configured to interface via a sideband I2C bus interface with the managed hardware components 220, 225, 230 of IHS. In some embodiments, the I2C co-processor 255b may be an integrated component of the service processor 255a, such as a peripheral system-on-chip feature that may be provided by the service processor 255a. Each I2C bus 275a-c is illustrated as single line in FIG. 2. However, each I2C bus 275a-c may be comprised of a clock line and data line that couple the remote access controller 255 to I2C endpoints 220a, 225a, 230a, which may be referred to as field replaceable units (FRUs).

As illustrated, the I2C co-processor 255b may interface with the individual managed devices 220, 225 and 230 via individual sideband I2C buses 275a-c selected through the operation of an I2C multiplexer 255d. Via switching operations by the I2C multiplexer 255d, a sideband bus connection 275a-c may be established by a direct coupling between the I2C co-processor 255b and an individual managed device 220, 225 or 230.

In providing sideband management capabilities, the I2C co-processor 255b may each interoperate with corresponding endpoint I2C controllers 220a, 225a, 230a that implement the I2C communications of the respective managed devices 220, 225, 230. The endpoint I2C controllers 220a, 225a, 230a may be implemented as a dedicated microcontroller for communicating sideband I2C messages with the remote access controller 255, or endpoint I2C controllers 220a, 225a, 230a may be integrated SoC functions of a processor of the respective managed device endpoints 220, 225, 230.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

FIG. 3 is a swim-lane diagram describing certain functional responsibilities of components implementing a method, according to some embodiments, for the management and assignment of storage drives available via a chassis, such as chassis 100 and the included storage devices described with regard to FIG. 1. As described, a chassis may include various IHSs, such as compute sleds 105a-n, and may also include various storage resources, such as storage sleds 115a-n and JBOD storage blades 155 accessible via a SAS expander 150. An administrator configuring a virtual storage profile, such a RAID data storage scheme, may utilize these available storage devices. However, an administrator working with a large-scale, enterprise storage system in which storage drives are being regularly replaced and repurposed, have a highly difficult, if not unmanageable, task in determining which of the storage drives that are currently available via a chassis are the most appropriate for configuring a requested configuration, or for replacing a failed storage device.

Additionally, storage devices are typically available for use by a storage controller in implementing a virtual storage profile only if the storage devices have been mapped for use by that particular storage controller. Data storage systems may maintain spare storage drives ready to be swapped in place of failed drives. However, in conventional scenarios, a storage controller is limited to use of spare storage devices that have been mapped to that particular storage controller. As described in additional detail with regard to FIG. 4, embodiments provide the ability for storage controllers 315 to rely on a global pool of spares maintained by the chassis management controller 320.

The chassis management controller 320 may be configured according to various embodiments to manage the storage devices 325 that are available as components of a chassis. In managing the storage devices 325, the chassis management controller 320 may track the storage devices 325 that have been mapped for use in a storage configuration by a storage controller 315, as well as tracking those mapped storage devices 325 that are currently unassigned and thus not in use by any virtual storage profile. Accordingly, at 330, the chassis management controller 320 may request each storage controller 315 installed within the chassis to specify the storage devices that have been mapped for use by the individual storage controller 315. In certain embodiments, the chassis management controller 320 may be configured to issue such a request upon receiving a notification from a storage controller 315 that the storage devices mapped to that storage controller have been modified. The chassis management controller 320 may also issue such a request to all storage controllers 315 installed within a chassis upon receiving a notification from any of the storage controllers 315 of a request, at 345, for storage devices to be designated for use in implementing a virtual storage profile requested at 335.

In this manner, the chassis management controller 320 may track all of the storage devices 325 that have been mapped for use by any of the storage controllers 315 that are installed within the chassis. Additionally, the chassis management controller 320 may track all of the mapped storage devices 325 that have not been designated for use in a virtual storage profile and are thus idle. In certain embodiments, the chassis management controller 320 may be configured to signal, at 330, each of the storage controllers 315 to place all such idle storage devices 325 that are mapped to a respective storage controller 315 in a low-power state. For instance, magnetic disk drives may be placed in a low-power state by spinning down these storage devices. Other types of storage devices may be similarly placed in sleep, hibernation or other power saving modes.

With the chassis management controller 320 managing the storage devices 325 in this manner, an administrator may utilize a user interface 305 provided via a remote access controller 310 in order to request configuration of a virtual storage profile for which storage devices 325 may be automatically selected from all of idle storage devices 325 managed by the chassis management controller 320. For instance, the user interface 305 may provide the administrator with the ability to select from available types of virtual storage profiles. In some scenarios, the administrator may be provided with a selection of virtual storage profiles that implement various types of RAID schemes. For instance, virtual storage profiles may provide options for generic RAID 0, generic RAID 1, generic RAID 5 or generic RAID 6 storage schemes. The selection of virtual storage profiles may also allow the administrator to select various parameters for the profile, such as a storage capacity and encryption capabilities for the requested storage configuration. In addition, the administrator may select an option for the storage controller 315 to request chassis management controller 320 for automatic selection and assignment of the storage devices for implementing the virtual storage profile, where the storage devices are selected from the pool of storage devices 315 managed by the chassis management controller 320.

Upon transmitting the administrator's requested storage configuration, at 340, the remote access controller 310 determines the storage drive requirements that are necessary to implement the requested virtual storage profile. For instance, based on the level of redundancy required for a requested RAID configuration, the remote access controller 310 may determine the number of separate storage devices that are required in order to provide the required redundancy. The remote access controller 310 may also determine various additional storage parameters, such as the block size, encryption and storage protocols for the storage devices that are required to implement the requested virtual storage profile. At 345, the remote access controller 310 transmits such storage device requirements to the chassis management controller 320.

The chassis management controller 320 proceeds, at 350, to identify the storage devices available in the chassis that may be used to satisfy the received storage drive requirements. In certain embodiments, the chassis management controller 320 may identify the storage devices 325 based on the identification of idle storage devices provided by each of the storage controllers at 330. The chassis management controller 320 may identify the idle storage devices 325 that most closely match the requirements for the requested storage configuration. In selecting storage devices from the pool of idle storage devices maintained by the chassis management controller 320, the implementation of the virtual storage profile draws from a larger pool of storage devices than would otherwise be available to the storage controller 315 that will be implementing the virtual storage profile. Drawing from a larger pool of idle storage devices 315 increases the opportunities to find a storage device that better matches the requirements for the requested virtual storage profile. This avoids certain inefficient configurations in which an administrator might otherwise manually select and map storage devices 325 that may be underutilized, such as selecting a storage device with a higher capacity that is required when a more appropriate storage device is available to the chassis management controller 320.

In another example, an administrator may manually select a storage device that supports encryption capabilities that are not required for the virtual storage configuration. As described, administrator may support large numbers of chassis, each with a fluid configuration of storage devices. Accordingly, when selecting storage devices for a virtual storage configuration, administrators may focus on identifying storage devices that meet the requirements for virtual storage configuration, with little ability to avoid inefficiencies, such as mapping a storage device that supports an unneeded encryption capability. The chassis management controller 320 according to the described embodiments may be configured to identify the set of storage devices from the pool of idle drives that best matches the requirements for the virtual storage configuration, thus minimizing inefficient mappings that underutilize storage device capabilities. Additionally, the chassis management controller 320 selects storage devices from a larger pool of idle drives than would be available via the individual storage controller being used to configure the virtual storage profile, thus increasing the likelihood that idle storage devices will be identified that better match the storage device requirements.

In selecting the storage devices 325 that best match the requirements of the requested storage configuration, in certain embodiments, the chassis management controller 320 may select groups of idle storage devices 325 that are located in physical proximity to each other. For instance, the chassis management controller 320 may select a set of idle storage devices 325 that are available within a single storage sled, such as storage sleds 115*a-n* of FIG. 1, or that are available within a single storage blade, such as a JBOD 155 that is configured from drives within a single storage blade.

The chassis management controller 320 selects, at 355, from the idle storage devices that satisfy the criteria set forth in the storage configuration request. In certain embodiments, the chassis management controller 320 may issue commands to the storage controller 315 to which a selected drive has been mapped directing selected storage devices 325 to exit low-power operating states based on the mapping of these selected storage devices 325. At 360, the chassis management controller 320 may notify the affected storage controllers 315 of the selected storage drives to be mapped. In certain instances, the selected storage devices may already be mapped for use by the storage controllers 315 that will implement the virtual storage configuration requested at 355. In such cases, no modifications to the storage device mappings are required. In other scenarios, the chassis management controller 320 may notify certain storage controllers to un-map storage devices that are being mapped for use by another storage controller in implementing the virtual storage configuration. In such scenarios, the chassis management controller 320 may issue corresponding notification to the storage controller to which the selected storage devices are being re-mapped.

Once the selected storage devices 325 are all mapped for use by the storage controller 315 that is implementing the virtual storage configuration, the storage controller may notify, at 360, the remote access controller 310 of the mapped storage devices 325 that have been designated for implementing the requested storage configuration. At 370, the remote access controller 310 may complete configuration of the requested storage profile by completing initialization of the requested virtual storage profile using the mapped storage devices. In this manner, each storage controller 315 may implement a virtual storage profile using storage devices that are selected by the chassis management controller 320 from all idle storage devices 325 that are mapped to any of the storage controllers 315 installed in the chassis.

Figure 4:
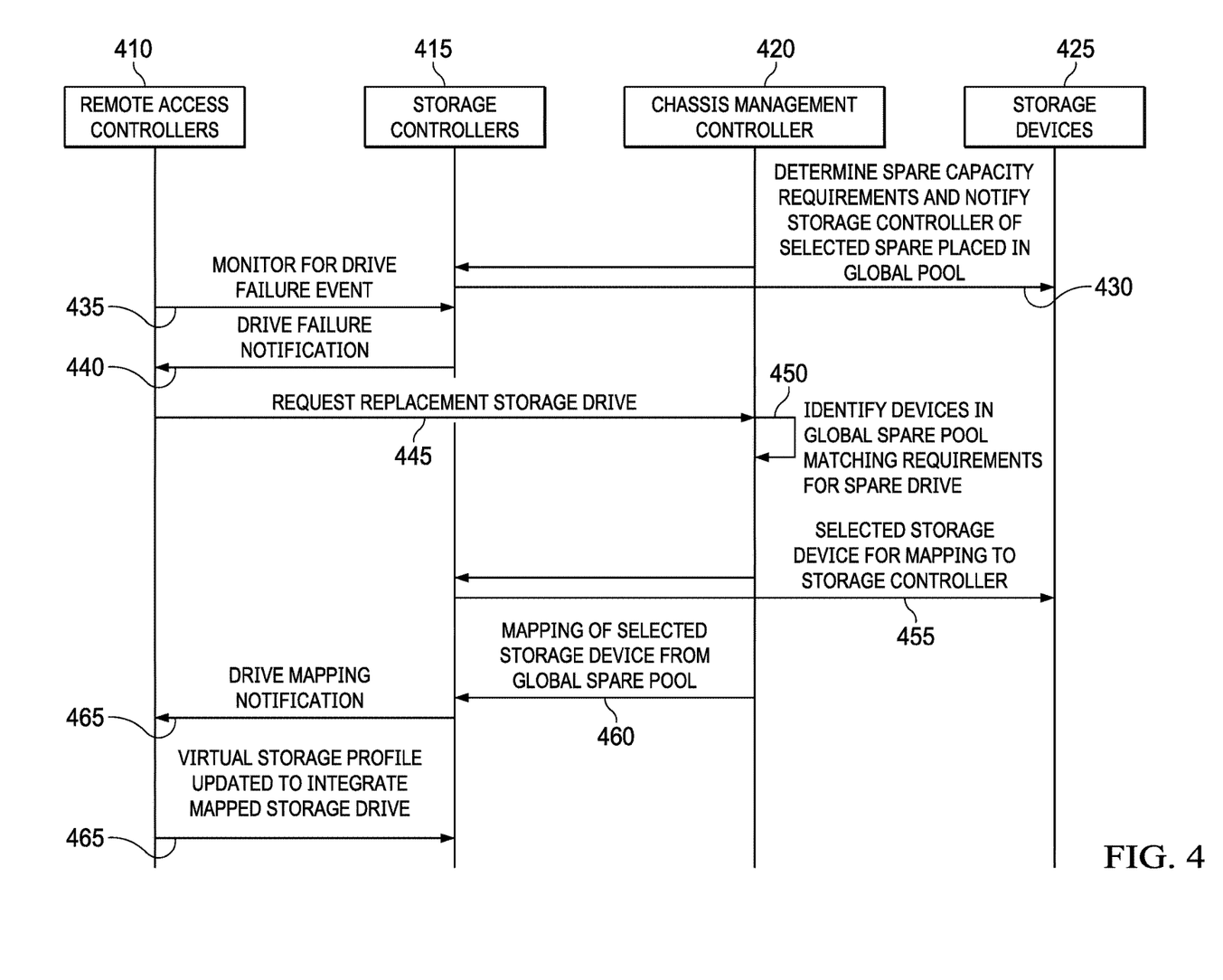
FIG. 4 is a swim-lane diagram describing certain functional responsibilities of components implementing a method, according to some embodiments, for the selection and configuration of a global pool of spare storage drives available via a chassis.

FIG. 4 is a swim-lane diagram describing certain functional responsibilities of components implementing a method, according to some embodiments, for the management of a global pool of spare storage devices available via a chassis. As described with regard to FIG. 1, individual storage devices, such as the storage devices that comprise storage sleds 115*a-n* and JBOD storage blades 155, may be designated as spare drives for use in replacing failed storage devices. Also as described, a chassis may include multiple IHSs, such as compute sleds 110*a-n*, that may each include a storage controller configured to support a virtual storage profile, such as a RAID scheme. In conventional storage configurations, each storage controller maintains spare storage devices that can be activated and incorporated into the virtual storage configuration in place of failed storage devices. In conventional scenarios, each storage controller maintains its own spare storage devices, which may result in a significant number of spare storage devices being separately maintained by the storage controllers installed in a chassis.

In certain embodiments, such as described with regard to FIG. 4, a chassis supporting multiple storage controllers 415 may maintain a global pool of spare storage devices from which replacement storage devices may be assigned. As described with regard to the embodiment of FIG. 3, the chassis management controller 420 may track the idle storage devices 425 the have been mapped to any of the storage controllers 415 supported by the chassis management controller 420. In addition, the chassis management controller 420 selects from these idle storage devices 425 in configuring a virtual storage profile. As described, such virtual storage profiles may require access to spare storage devices.

In certain embodiments, the configuration of a virtual storage profile to be implemented by a storage controller 415, such as described with regard to 335 of FIG. 3, may include the option for the chassis management controller 420 to provide the spare storage devices required for the requested virtual storage profile. In scenarios the chassis management controller 420 is managing spares, a virtual storage profile is implemented without the storage controller 415 designating any storage devices as spares.

Instead, the spare drive requirements may be determined by the chassis management controller 420 based on the virtual storage profile requirements provided by the storage controller with regard to 345 of FIG. 3. The chassis management controller 420 may support spare drive requirements for multiple storage controllers 415, each supporting multiple different virtual storage profiles, installed within a chassis. As the chassis management controller 420 manages spares for more virtual storage profiles, the chassis management controller 420 may reduce the ratio of global active storage capacity that is being supported in all supported virtual storage profiles versus the global spare drive capacity that is maintained. In certain embodiments, the chassis management controller 420 may place an upper limit on the number of individual storage devices 425 that will be maintained in reserve in the global pool of spares.

Upon determining the spare drive capacity for a virtual storage profile, the chassis management controller 420 may identify and designate the required spare storage device(s) from the pool of idle storage devices 420 that have been mapped to any of the storage controllers 415. At 430, the chassis management controller 420 may notify the storage controller 415 to which the selected idle storage device is mapped of the designation of the storage device as a global spare. In some embodiments, the chassis management controller 420 may further direct the storage controller 415 to place the designated global spare device a low-power operating mode.

Drawing from the global pool of spares, the chassis management controller 420 may designate spare storage devices 425 from the global pool as replacements for storage devices that have failed. In the operation of each IHS installed within a chassis, a remote access controller 410 may monitor, at 435, a storage controller 415 for notifications of storage drive failures within the virtual storage configurations supported by the storage controller 415. Upon the storage controller 415 detecting a drive failure, at 440, the remote access controller 410 is notified of the failure and the specifications of the failed device.

The remote access controller 410 may issue a request to the chassis management controller 420, at 445, for a replacement storage device. The request may include the specifications of the failed storage device and any additional or separate requirements for a replacement drive. For instance, the storage configuration implemented by the storage controller 415 may not necessarily require a replacement with the exact specifications of the failed device. The failed device may support encryption, but the implemented storage configuration may not require support for encryption. Accordingly, both the specifications of the failed device and the requirements for a replacement device may be communicated to the chassis management controller 420.

Based on the specifications of the failed drive and requirements for a replacement drive, the chassis management controller 420 may identify, at 450, the storage devices 425 within the global pool of spares that best match the requirements for a replacement for the failed drive identified at 435. The chassis management controller 420 may identify matching spares based on locally stored information about each of the storage devices currently mapped to any of the supported storage controllers 415. At 455, the chassis management controller 420 notifies the storage controller 415 to which the selected spare is mapped to wake the selected drive. In certain instances, the chassis management controller 420 may map the selected spare device 425 to the storage controller 415 reporting the drive failure.

In some embodiments, the chassis management controller 420 may be configured to select a storage device, at 455, from the global pool that most closely matches the specifications of the failed drive, thus avoiding the possibility of discovering incompatibilities when incorporating the replacement device into the existing configuration. In other embodiments, chassis management controller 420 may be configured to select a storage device from the global pool based on requirements for the virtual storage profile in which the failed drive was mapped, thus allowing for more efficient mappings of the storage devices in the global pool.

As described, the chassis management controller 420 may provide a global pool of spares based on storage devices 425 that are mapped to any storage controller supported by a chassis management controller 420, and in some embodiments, also based on spares maintained by any similarly configured chassis that is accessible by the chassis management controller 420. By increasing the size of the global pool of spares, the odds are improved that chassis management controller 420 will be able to locate a suitable spare that can be used to seamlessly replace failed storage device, thus minimizing the impact on the storage configuration supported by the storage controller 415

Once the storage device 425 selected for replacement has been mapped for use by the storage controller 415, the storage controller may notify, at 465, the remote access controller 410 of the storage device that has been mapped as a replacement of the failed storage device indicated in the notification by the storage controller at 440. At 470, the remote access controller 310 may complete replacement of the failed drive by integrating the mapped replacement storage device into the virtual storage profile, in some cases by rebuilding the virtual storage profile, now including the mapped replacement drive from the global pool.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for managing and configuring storage devices available to a plurality of IHSs (Information Handling Systems) installed as components of a chassis, the method comprising:

identifying, by a chassis management controller, a plurality of idle storage devices mapped to any of a plurality of storage controllers installed in the plurality of IHSs, and wherein the chassis management controller manages the plurality of idle storage drives such that the chassis management controller maintains a limit on the number of idle storage drives that are managed by the chassis management controller such that the plurality of storage controllers forgo management of idle storage drives;

receiving a request, by the chassis management controller, from a first IHS of the plurality of IHSs, for configuration of a first virtual storage profile using the managed plurality of idle storage drives;

determining, by a remote access controller of the first IHS, physical storage requirements for implementing the requested first virtual storage profile;

selecting, by the chassis management controller, a first set of storage devices from the plurality of idle storage devices based on the physical storage requirements provided by the remote access controller;

mapping the first set of storage devices to a first storage controller of the first IHS; and configuring, by the first storage controller of the first IHS, the requested first virtual storage profile using the mapped first set of storage devices.

2. The method of claim 1, further comprising:

setting each of the storage devices identified as idle by the chassis management controller in a low-power state.

3. The method of claim 1, further comprising:

determining, by the chassis management controller, a ratio of a number of spare storage drives that are supported on behalf of the first virtual storage profile with respect to the limit on the number idle storage drives that are managed by the chassis management controller.

4. The method of claim 3, wherein the number of spare storage drives used in determining the ratio is based on data redundancy requirements for implementing the requested first virtual storage profile.

5. The method of claim 3, further comprising:

designating, by the chassis management controller, a first storage device from the plurality of idle storage devices as a global spare, wherein the first storage device provides the actual spare capacity requirements, wherein the limit on the number of storage drives managed by the chassis management controller limit the number of idle storage drives that are designated as global spares.

6. The method of claim 5, further comprising:

receiving, by the chassis management controller, a notification of a failed storage device in a virtual storage profile supported by a first storage controller of the plurality of storage controllers.

7. The method of claim 6, further comprising:

selecting, by the chassis management controller, a storage device from the storage devices designated as global spares as a replacement for the failed storage device.

8. The method of claim 7, further comprising:

mapping the storage device selected from the global spares to the first storage controller as a replacement for the failed storage device.

9. A system comprising:

a plurality of storage devices;

a plurality of IHSs (Information Handling Systems) installed as components of a chassis, wherein each IHS comprises a plurality of storage controllers and a remote access controller configured to:

receive a request for configuration of a first virtual storage profile by a first storage controller of the plurality of storage controllers;

determine physical storage requirements for implementing the requested first virtual storage profile; and a chassis management controller configured to:

identify idle storage devices within the plurality of storage devices, wherein the plurality of storage devices are mapped to one of the storage controllers, manage the plurality of idle storage drives such that the chassis management controller maintains a limit on the number of idle storage drives that are managed by the chassis management controller such that the plurality of storage controllers forgo management of idle storage drives;

select a first set of storage devices from the idle storage devices based on the determined physical storage requirements; and map the first set of storage devices to the first storage controller for configuring the requested first virtual storage profile.

10. The system of claim 9, wherein the chassis management controller is further configured to direct each of the identified idle storage devices to be set in a low-power state.

11. The system of claim 9, wherein the chassis management controller is further configured to determine a ratio of a number of spare storage drives that are supported on behalf of the first virtual storage profile with respect to the limit on the number idle storage drives that are managed by the chassis management controller.

12. The system of claim 11, wherein the number of spare storage drives used in determining the ratio is based on data redundancy requirements for implementing the requested first virtual storage profile.

13. The system of claim 9, wherein the chassis management controller is further configured to designate a first storage device from the plurality of idle storage devices as a global spare, wherein the first storage device provides the spare capacity requirements, wherein the limit on the number of storage drives managed by the chassis management controller limit the number of idle storage drives that are designated as global spares.

14. The system of claim 13, wherein the chassis management controller is further configured to receive a notification of a failed storage device in a virtual storage profile supported by a first storage controller of the plurality of storage controllers.

15. The system of claim 14, wherein the chassis management controller is further configured to select a storage device from the storage devices designated as global spares as a replacement for the failed storage device.

16. The method of claim 15, wherein the chassis management controller is further configured to map the storage device selected from the global spares to the first storage controller as a replacement for the failed storage device.

17. A chassis management controller configured as a component of a chassis comprising a plurality of storage devices and a plurality of IHSs (Information Handling Systems), the chassis management controller comprising:

one or more processors; and a memory device coupled to the one or more processors, the memory device storing computer-readable instructions that, upon execution by the one or more processors, cause the chassis management controller to:

identify idles storage devices within the plurality of storage devices mapped to any of a plurality of storage controllers installed in the plurality of IHSs, and wherein the chassis management controller manages the plurality of idle storage drives such that the chassis management controller maintains a limit on the number of idle storage drives that are managed by the chassis management controller such that the plurality of storage controllers forgo management of idle storage drives;

receive a request for configuration of storage devices required for implementing a first virtual storage profile by a first storage controller of a first IHS of the plurality of IHSs;

select a first set of storage devices from the idle storage devices based on storage device requirements provided in the request; and map the first set of storage devices to the first storage controller for configuring the requested first virtual storage profile.

18. The chassis management controller of claim 17, wherein execution of the computer-readable instructions further causes the chassis management controller to determine a ratio of a number of spare storage drives that are supported on behalf of the first virtual storage profile with respect to the limit on the number idle storage drives that are managed by the chassis management controller.

19. The chassis management controller of claim 18, wherein execution of the computer-readable instructions further causes the chassis management controller to designate a first storage device from the plurality of idle storage devices as a global spare, wherein the first storage device provides the spare capacity requirements, wherein the limit on the number of storage drives managed by the chassis management controller limit the number of idle storage drives that are designated as global spares.

20. The chassis management controller of claim 19, wherein execution of the computer-readable instructions further causes the chassis management controller to:

receive a notification of a failed storage device in a virtual storage profile supported by a second storage controller of the plurality of storage controllers;

select a storage device from the storage devices designated as global spares as a replacement for the failed storage device; and map the storage device selected from the global spares to the second storage controller as a replacement for the failed storage device.

* * * * *